(12) United States Patent
Polland et al.

(10) Patent No.: US 8,781,086 B2
(45) Date of Patent: Jul. 15, 2014

(54) SYSTEM AND METHOD FOR CIRCUIT EMULATION

(75) Inventors: Joseph Polland, Eden Prairie, MN (US); Laxman Anne, Eden Prairie, MN (US); Clifton Powers, Raleigh, NC (US); Manish Kumar Sharma, Eden Prairie, MN (US)

(73) Assignee: ADC DSL Systems, Inc., Shakopee, MN (US)

( * ) Notice: Subject to any disclaimer, the term of this patent is extended or adjusted under 35 U.S.C. 154(b) by 158 days.

(21) Appl. No.: 13/533,063

(22) Filed: Jun. 26, 2012

(65) Prior Publication Data

US 2013/0343528 A1    Dec. 26, 2013

(51) Int. Cl.
*H04M 11/00*    (2006.01)
*G06F 15/16*    (2006.01)

(52) U.S. Cl.
USPC ........ 379/93.06; 370/232; 370/258; 370/352; 370/497; 370/510; 379/93.25; 398/66; 709/217; 709/226; 709/232; 709/235; 709/249

(58) Field of Classification Search
CPC .................. H04M 11/062; H04L 12/2856
USPC ......... 370/232, 352, 510, 230, 258, 356, 497, 370/503; 379/93.06, 93.25; 709/217, 249, 709/226, 232, 235; 398/66
See application file for complete search history.

(56) References Cited

U.S. PATENT DOCUMENTS

| | | | |
|---|---|---|---|
| 6,459,708 B1 | 10/2002 | Cox et al. | |
| 6,584,122 B1 | 6/2003 | Matthews | |
| 6,829,252 B1 | 12/2004 | Lewin | |
| 6,956,933 B2* | 10/2005 | Virag et al. | 379/93.25 |
| 6,963,561 B1 | 11/2005 | Lahat | |
| 7,054,915 B2* | 5/2006 | Richardson et al. | 709/217 |
| 7,088,742 B2 | 8/2006 | Oliver et al. | |
| 7,103,008 B2* | 9/2006 | Greenblat et al. | 370/258 |
| 7,233,587 B2 | 6/2007 | Pattavina et al. | |
| 7,289,538 B1* | 10/2007 | Paradise et al. | 370/497 |
| 7,304,986 B2* | 12/2007 | Allen et al. | 370/356 |
| 7,515,605 B2 | 4/2009 | Harel et al. | |
| 7,613,212 B1* | 11/2009 | Raz et al. | 370/510 |
| 7,619,973 B2* | 11/2009 | Richardson et al. | 370/232 |
| 7,649,910 B1* | 1/2010 | Wechsler et al. | 370/503 |

(Continued)

OTHER PUBLICATIONS

Ernhofer et al, "Circuit Emulation Services-over-Packet and Standards Adoption", Jul. 2004, pp. 15, Publisher: Analog Zone.

(Continued)

*Primary Examiner* — Gerald Gauthier
(74) *Attorney, Agent, or Firm* — Fogg & Powers LLC

(57) ABSTRACT

A digital subscriber line (DSL) unit comprises a first user port configured to communicate signals according to an Ethernet protocol and a second user port configured to communicate signals according to a second non-Ethernet protocol The DSL unit also comprises at least one DSL port configured to communicate signals according to a DSL protocol; and a processing device configured to analyze Ethernet signals received over the first user port to determine when to output data from the respective received Ethernet signals over the second user port and when to output data from the respective received Ethernet signals over the at least one DSL port. The processing device is further configured to extract data from signals received over the second user port and insert the extracted data into a corresponding Ethernet signal having a respective emulated circuit identification and to output the corresponding Ethernet signal over the first user port.

22 Claims, 10 Drawing Sheets

(56) References Cited

U.S. PATENT DOCUMENTS

| | | | |
|---|---|---|---|
| 7,660,330 B1 * | 2/2010 | Shmilovici | 370/503 |
| 7,720,088 B2 | 5/2010 | Wu | |
| 7,751,408 B2 | 7/2010 | Pirbhai et al. | |
| 7,765,300 B2 * | 7/2010 | Meehan et al. | 709/226 |
| 7,856,036 B2 | 12/2010 | Polland et al. | |
| 7,869,464 B2 | 1/2011 | Poland et al. | |
| 7,953,108 B2 | 5/2011 | Polland et al. | |
| 7,961,755 B2 | 6/2011 | Harel et al. | |
| 8,005,978 B1 * | 8/2011 | Duffie et al. | 709/235 |
| 8,040,887 B2 | 10/2011 | Boutaud De La Combe et al. | |
| 8,144,690 B2 * | 3/2012 | Richardson et al. | 370/352 |
| 8,589,582 B2 * | 11/2013 | Melsen et al. | 709/232 |
| 2003/0091061 A1 | 5/2003 | Oliver et al. | |
| 2003/0093703 A1 | 5/2003 | Oliver et al. | |
| 2003/0217182 A1 * | 11/2003 | Liu et al. | 709/249 |
| 2005/0174938 A1 * | 8/2005 | Richardson et al. | 370/230.1 |
| 2010/0104285 A1 * | 4/2010 | Shaffer et al. | 398/66 |
| 2011/0064092 A1 | 3/2011 | Polland et al. | |
| 2013/0343528 A1 * | 12/2013 | Polland et al. | 379/93.06 |

OTHER PUBLICATIONS

"Technical White Paper for Circuit Emulation Service over PSN", Apr. 3, 2007, pp. 1-18.

"Implementation Agreement for the Emulation of PDH Circuits over Metro Ethernet Networks", Oct. 2004, pp. 134, Publisher: Metro Ethernet Forum.

"Introduction to Circuit Emulation Services over Ethernet", Oct. 2004, pp. 1-6, Publisher: Metro Ethernet Forum.

* cited by examiner

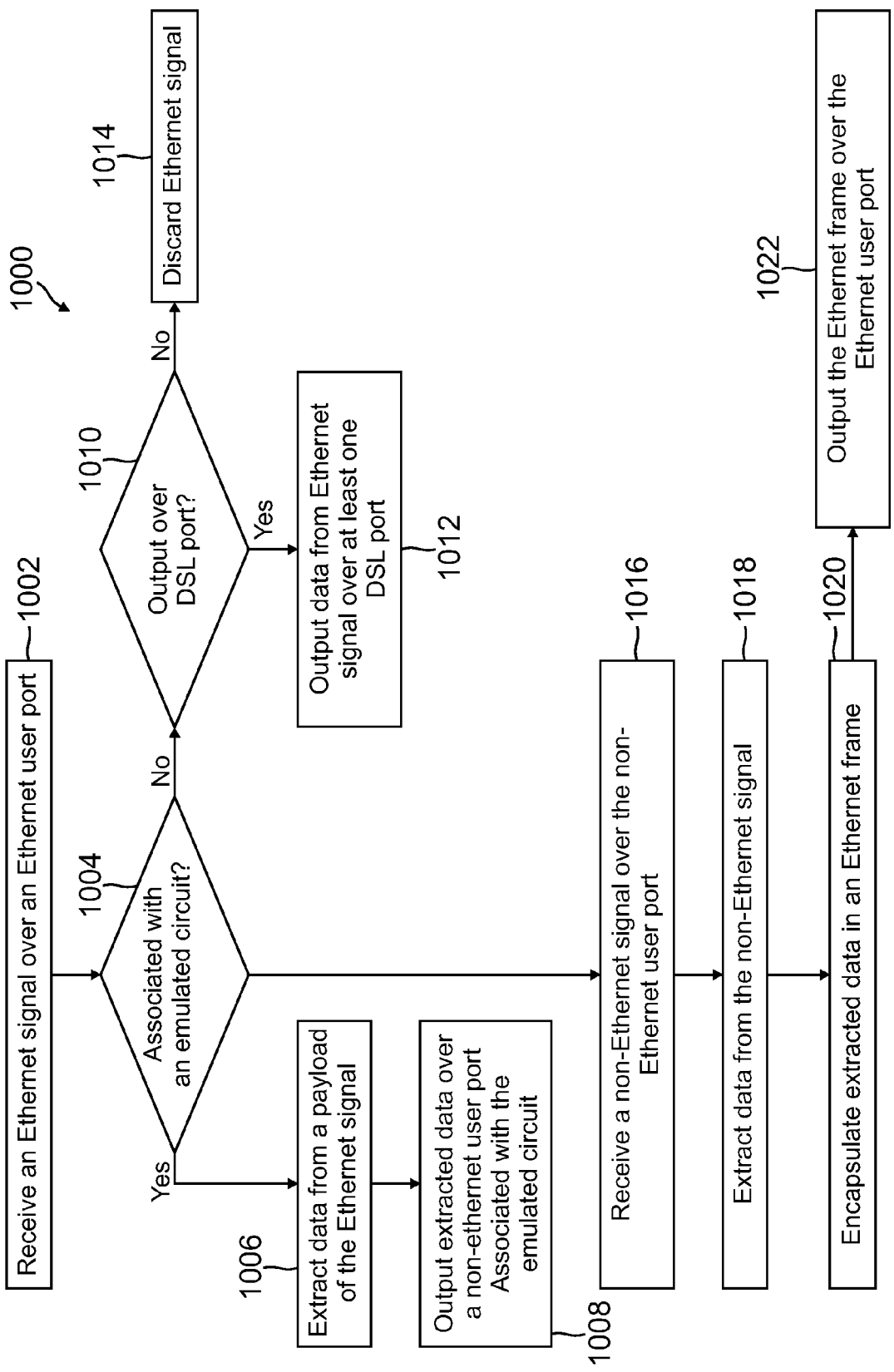

US 8,781,086 B2

SYSTEM AND METHOD FOR CIRCUIT EMULATION

BACKGROUND

In order to connect different locations for telephone, internet, or data services, some organizations lease a dedicated line or private circuit. For example, a G.703 (e.g. E1) or T1 line can be leased for providing the necessary communication services to connect two private branch exchanges. The leased line can also be used to connect a remote public branch exchange with a central office exchange. However, such leased lines can involve a significant cost for the organizations.

SUMMARY

In one embodiment, a digital subscriber line (DSL) unit is provided. The DSL unit comprises a first user port configured to transmit and receive signals according to an Ethernet protocol and a second user port configured to transmit and receive signals according to a second protocol, wherein the second protocol is different from the Ethernet protocol. The DSL unit also comprises at least one DSL port configured to transmit and receive signals according to a DSL protocol; and a processing device configured to analyze Ethernet signals received over the first user port to determine when to output data from the respective received Ethernet signals over the second user port and when to output data from the respective received Ethernet signals over the at least one DSL port. The processing device is further configured to extract data from signals received over the second user port and insert the extracted data into a corresponding Ethernet signal having a respective emulated circuit identification and to output the corresponding Ethernet signal over the first user port.

DRAWINGS

Understanding that the drawings depict only exemplary embodiments and are not therefore to be considered limiting in scope, the exemplary embodiments will be described with additional specificity and detail through the use of the accompanying drawings, in which:

FIG. 10 is a flow chart depicting one embodiment of a method of communicating data in a communication system.

Figure 1:
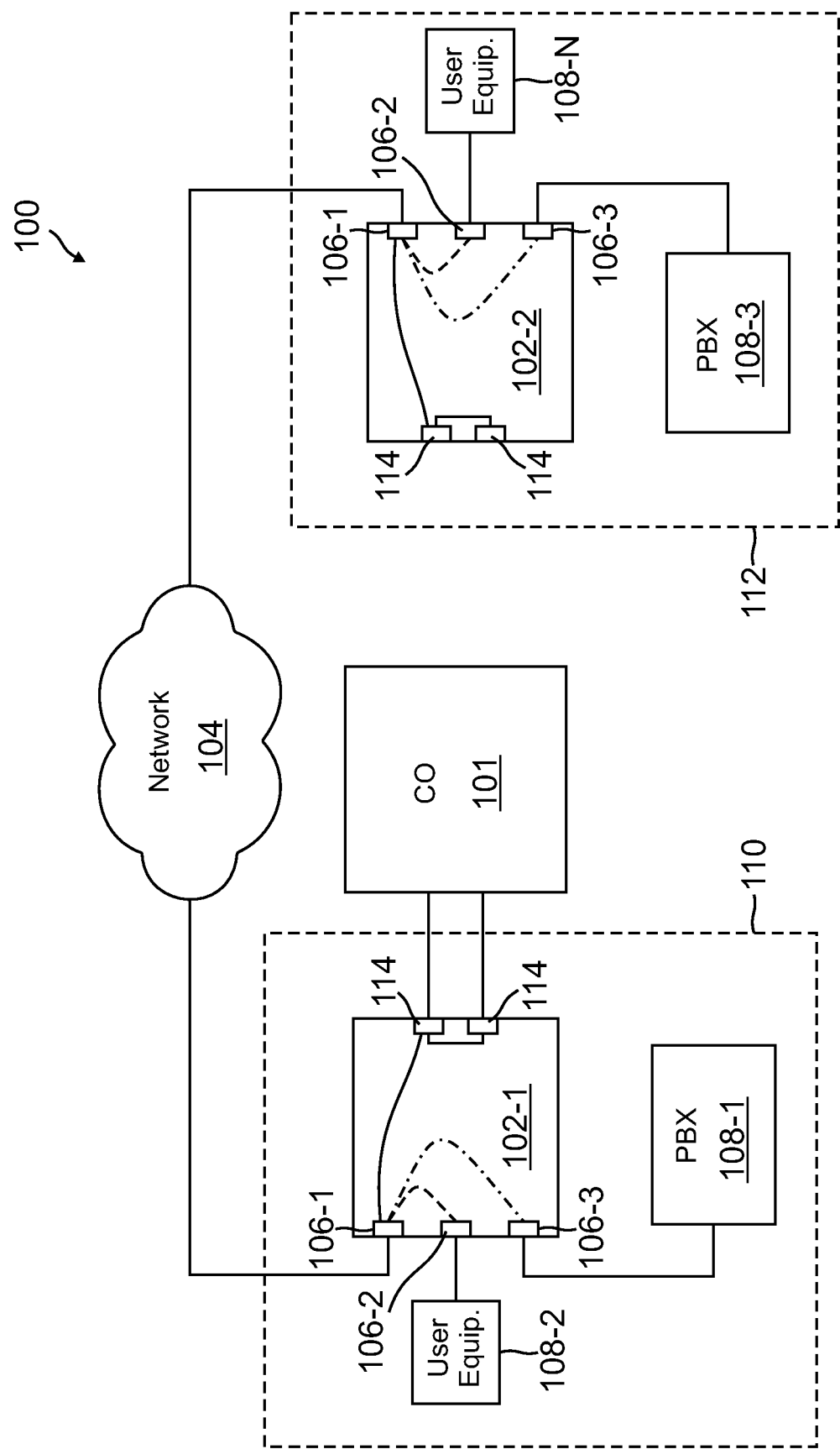
FIG. 1 is a high level block diagram of one embodiment of an exemplary communication system.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

FIG. 1 is high level block diagram of one embodiment of an exemplary communication system 100. System 100 includes a plurality of communication units, such as units 102-1 and 102-2. Communication unit 102-1 is located in a first location 110 and communication unit 102-2 is located in a second location 112. Location 110 and location 112 can be located relatively close geographically (e.g. in the same work site or building) or located relatively far geographically (e.g. in different cities). The maximum distance between locations 110 and 112 is influenced by the implementation of network 104 as described in more detail below.

Each of the communication units 102-1 and 102-2 includes a plurality of user interface ports 106-1 . . . 106-3. In this example, each of communication units 102-1 and 102-2 includes three user interface ports 106. However, it is to be understood that, in other embodiments, communication units 102-1 and 102-2 include fewer or more user interface ports 106. In addition, in some embodiments, communication unit 102-1 does not include the same amount of user interface ports 106 as communication unit 102-2. A user interface port is a port that typically couples the communication unit to user premises equipment as opposed to coupling the communication unit 102 to a central office 101, such as via DSL ports 114. Furthermore, as used herein, the terms "user interface port," "user port," and "application port" are used interchangeably.

At least one of the plurality of user interface ports 106 is configured according to an Ethernet protocol. For example, in the embodiment of FIG. 1, user interface port 106-1 is configured according to the 10/100 Base-T Ethernet protocol. However, it is to be understood that other Ethernet protocols, such as 1000BASE-T Ethernet, can be used in other embodiments. Discussion of Ethernet-based protocols herein refers to implementations of one or more of the family of IEEE 802.3 family of standards.

In addition, at least one of the user interface ports 106 is configured according to a protocol different from an Ethernet protocol. For example, in this embodiment, user port 106-2 is configured according to an Nx64k protocol. The Nx64k protocol is a timeslot based format, which is configured with rates up to 178 timeslots. Nx64k is a generic term and an application port for Nx64k protocol can be configured, for example, according to V.35, V.36, X.21, or RS-530 standards.

In addition, user port 106-3 is configured according to a G.703 protocol in this embodiment. The G.703 standard is an International Telecommunication Union Telecommunication (ITU-T) standard defining protocols for transmitting voice or data over digital carriers, such as T-carrier and E-carrier protocols. G.703 provides the specifications for pulse code modulation. In one implementation of this embodiment, G.703 is sent over balanced 120 ohm twisted pair cables terminated in RJ-45 jacks. In addition, G.703 can operate in one of two modes: structured and unstructured. The structured mode is a frame format having a specified length for the timeslots. The unstructured mode is a continuous bit stream of 2 MBits/second for E1 and 1.55 MBits/second for T1.

It is to be understood that the user interface ports discussed in the embodiment of FIG. 1 are provided by way of example and not by way of limitation. In particular, fewer or more ports can be implemented in other embodiments. For example, in some embodiments, no user ports are configured according to an Nx64k protocol and more than one user port is configured according to a G.703 protocol. In other embodiments, a plurality of ports is configured according to an Nx64K protocol and a plurality of ports is configured according to a G.703 protocol. Similarly, in some embodiments, a plurality of ports is configured according to an Ethernet protocol. Hence, the type and number of ports in each communication unit vary for the corresponding implementation. However, at least one of the user interface ports 106 is configured according to an Ethernet protocol (e.g. user port 106-1 in the example of FIG. 1) and at least one of the user interface ports 106 is configured according to a protocol different than an Ethernet protocol.

Communication unit 102-1 is configured to terminate signals received over a non-Ethernet configured user interface port. That is, the communication unit 102-1 extracts the data in the payload of the non-Ethernet signal and encapsulates the data in an Ethernet frame as described in more detail below. The communication unit 102-1 then outputs the Ethernet frame containing the data from the non-Ethernet signal over the Ethernet user port 106-1.

User port 106-1 in communication unit 102-1 is communicatively coupled to a corresponding Ethernet user port 106-1 in communication unit 102-2 via a network 104. The network 104 can be implemented using one of various known networking technologies as described in more detail below. The communication unit 102-2 removes the Ethernet header of the received signal and generates a new signal containing the data in the payload of the received Ethernet signal. For example, in some embodiments, a new signal is generated according to the same protocol as the original non-Ethernet signal from which the data was extracted. However, in other embodiments, a new signal is generated according to a protocol that is different from the protocol of the original non-Ethernet signal.

Hence, an emulated circuit is created between the respective non-Ethernet user ports of communication units 102-1 and 102-2 via the respective Ethernet ports and the network 104. For example, in the embodiment of FIG. 1, an emulated circuit is created between user interface port 106-2 in communication unit 102-1 and user interface port 106-2 in communication unit 102-2. Similarly, an emulated circuit is created between user interface port 106-3 in communication unit 102-1 and user interface port 106-3 in communication unit 102-2.

Emulating a G.703 or Nx64k circuit over the Ethernet port in the exemplary system 100 enables various benefits and advantages. For example, expensive dedicated G.703 leased lines between locations can be replaced with the emulated circuit. Additionally, G.703 or Nx64k connectivity can be provided between locations where leased line service is not available. For example, in the United States of America, T-carrier protocols are used, whereas E-carrier protocols are typically used in European nations. Through the circuit emulation of system 100, T-carrier connectivity can be provided in European nations and E-carrier connectivity can be provided in the United States of America. Thus, system 100 provides cost reduction and service availability not previously available.

Hence, user equipment 108-1 and 108-2 are coupled to corresponding user equipment 108-3 and 108-N. For example, in this embodiment, user equipment 108-1 and 108-3 are implemented as switches in a private branch exchange (PBX). Hence, voice and/or other data can be communicated between locations 110 and 112 via the network 104 and the Ethernet ports 106-1 in communication units 102-1 and 102-2. However, it is to be understood that user equipment can be implemented differently in other embodiments. For example, in another embodiment, user equipment 108-1 is a central office public exchange located at the telephone company.

Communication unit 102-1 is further configured to determine when to couple data received over the user interface ports 106 to an emulated circuit, as described above, or to digital subscriber line (DSL) ports 114. In other words, communication unit 102-1 operates simultaneously as a converter unit for an emulated circuit and as a DSL unit. For example, when a signal is received over Ethernet port 106-1, the communication unit 102-1 determines whether to couple the signal with DSL ports 114 or with one of the non-Ethernet user ports 106-2 or 106-3 based, at least in part, on data in the header of the respective received Ethernet signal. In other words, upon receiving an Ethernet signal over the Ethernet port 106-1, the communication unit 102-1 analyzes the Ethernet signal's header to determine if the data should be routed over the DSL ports 114 or routed to one of the non-Ethernet user ports 106-2 or 106-3. Similarly, when a signal is received over one of the non-Ethernet ports, the communication unit 102-1 determines if the data in the received signal should be routed over the DSL ports 114 or to the Ethernet port 106-1 for the emulated circuit.

Each emulated circuit is configured a priori at both the communication unit 102-1 and the communication unit 102-2. In particular, destination/source addresses and network parameters are set for each emulated circuit. As used herein, in describing a communication unit, the term "local" refers to elements or attributes pertaining to or co-located with the communication unit being described. For example, in describing communication unit 102-1, a local address or a local user interface port for communication unit 102-1 is an address assigned to communication unit 102-1 or a user interface port located in communication unit 102-1. Similarly, in describing communication unit 102-2, a local address is an address assigned to communication unit 102-2 and a local user interface port is a user interface port located in communication unit 102-2. Hence, the term "local" is relative to the communication unit being described.

For example, at communication unit 102-1, the source address is the local address of the communication unit 102-1 and the destination address is the address of communication unit 102-2. Similarly, at communication unit 102-2, the source address is the local address of the communication unit 102-2 and the destination address is the address of communication unit 102-1. The source/destination addresses include IP addresses and media access control (MAC) addresses based on the implementation of network 104 as described in more detail below.

In addition, configuring the emulated circuit includes configuring unique emulated circuit IDs. The emulated circuit ID is used to identify which emulated circuit the data belongs to when there is more than one possible emulated circuit. For example, in FIG. 1, a first emulated circuit can be configured between user interface port 106-2 in communication unit 102-1 and user interface port 106-2 in communication unit 102-2. A second emulated circuit can be configured between user interface port 106-N in communication unit 102-1 and user interface port 106-N in communication unit 102-2. Other emulated circuits can also be configured. For example, an emulated circuit can be configured between user interface port 106-2 in communication unit 102-1 and user interface port 106-N in communication unit 102-2. When the communication units 102 receive the data over the respective Ethernet port 106-1, the communication units 102 determine to which emulated circuit the data belongs based on the emulated circuit ID.

Figure 2A:
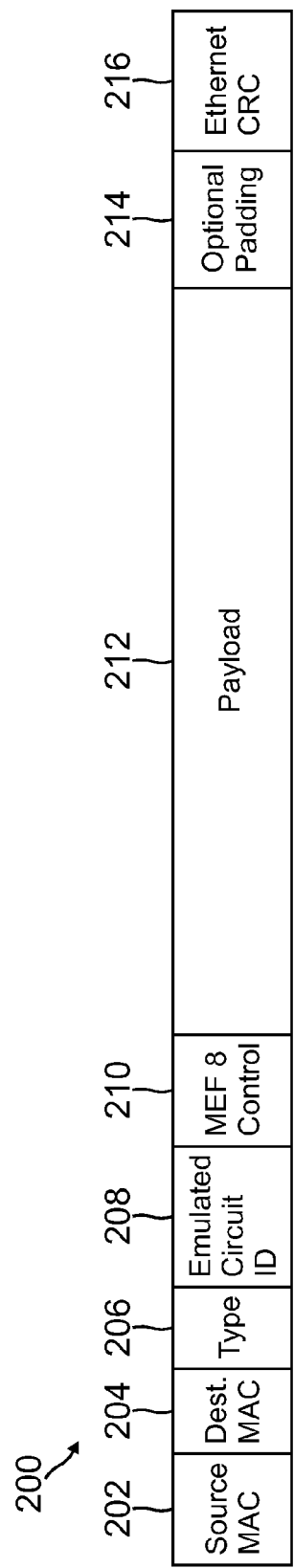
FIGS. 2A-2C depict embodiments of exemplary frame formats.
Figure 3:
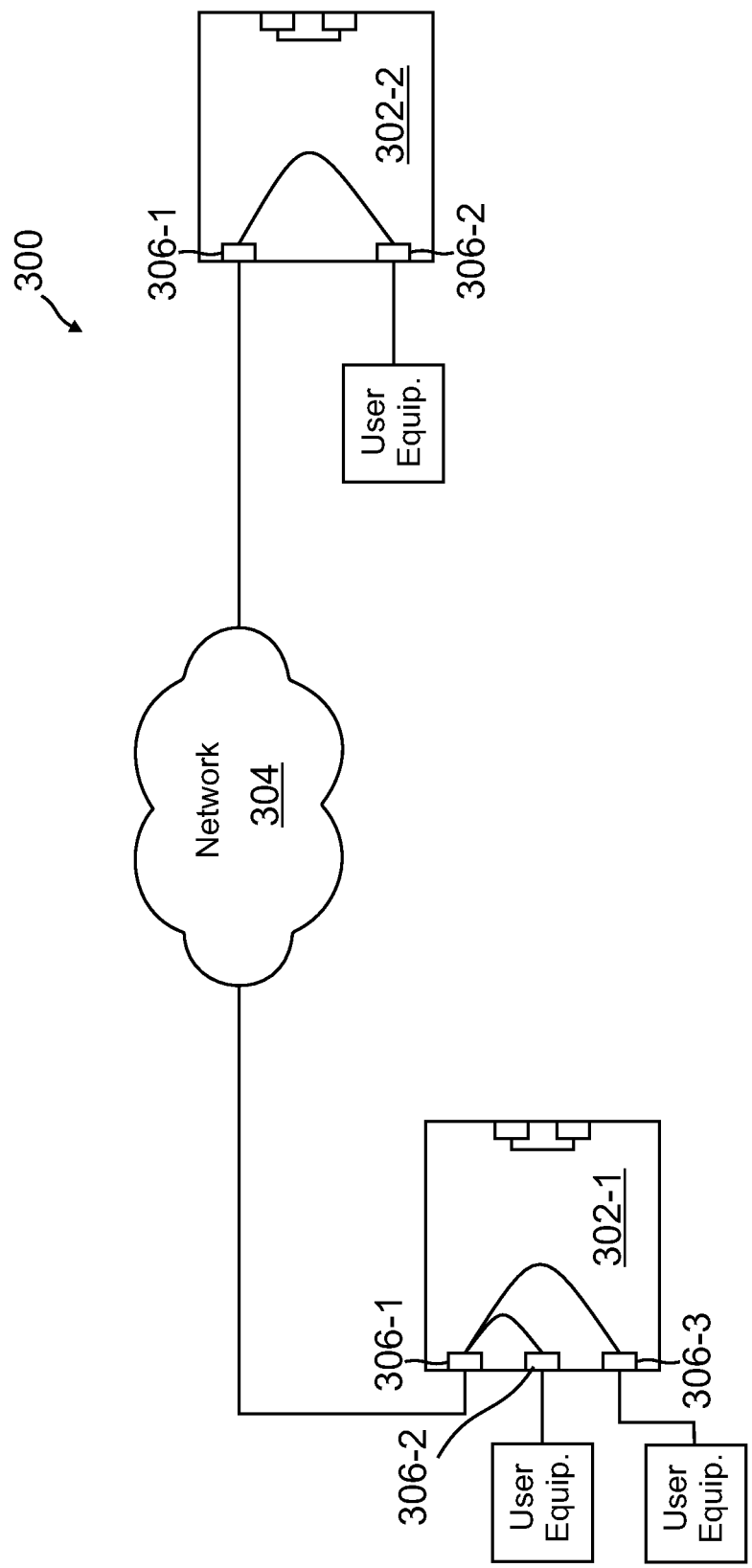
FIG. 3 is a high level block diagram of another embodiment of an exemplary communication system.

An exemplary Ethernet frame format 200 having an emulated circuit ID field is shown in FIG. 2A. The frame format 200 can be used, for example, in system 100 when implementing network 104 as a local area Ethernet network, such as is shown in FIG. 3. Frame format 200 includes a source MAC address 202 and a destination MAC address 204. As stated above, the source MAC address 202 is the address of the local communication unit sending the data over the Ethernet port. The destination MAC address is the address of the communication unit to which the data is being transmitted. The destination MAC address is configured as part of configuring the emulated circuit.

The frame format 200 also includes a type field 206 which is used to identify that the frame contains data for an emulated circuit. The frame format 200 also includes the emulated circuit ID 208 which identifies the emulated circuit. Hence, the receiving communication unit can determine to which port the data in the payload 210 should be routed based on the emulated circuit ID 208. The Metro Ethernet Forum (MEF) 8 control 210 contains circuit emulation information, such as the length and sequence number for the data in the payload 212. In some embodiments, one received non-Ethernet frame is mapped to one Ethernet frame for the circuit emulation. In such embodiments, padding 214 of empty data is used in the payload 212, when necessary, to maintain the minimum Ethernet frame size and/or an integral number of bytes. In other embodiments, non-Ethernet frames for a specific emulated circuit are buffered until enough are received to be mapped to the Ethernet frame without needing to use the optional padding 214 in the payload 212. The frame format 200 also includes a cyclic redundancy check (CRC) field 216 for use in detecting errors as known to one of skill in the art.

Figure 2B:

Another exemplary Ethernet frame format 201 is shown in FIG. 2B. Frame format 201 is similar to frame format 200. However, frame format 201 also includes an optional IEEE 802.1q tag protocol ID 218 which is also referred to as a virtual LAN (VLAN) tag. The VLAN tag 218 is used by bridges and switches in handling Ethernet frames in a virtual LAN as known to one of skill in the art. In addition, frame format 201 also optionally includes a class of service tag 220. The class of service tag 220 specifies a priority value that is used to differentiate and shape network traffic.

Figure 2C:
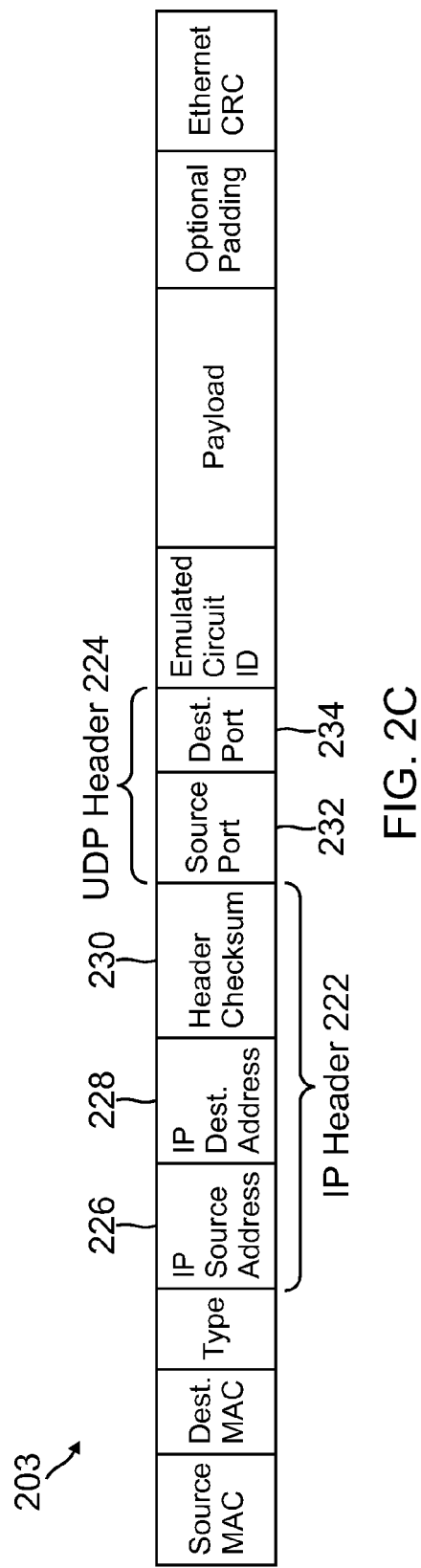
Figure 4:
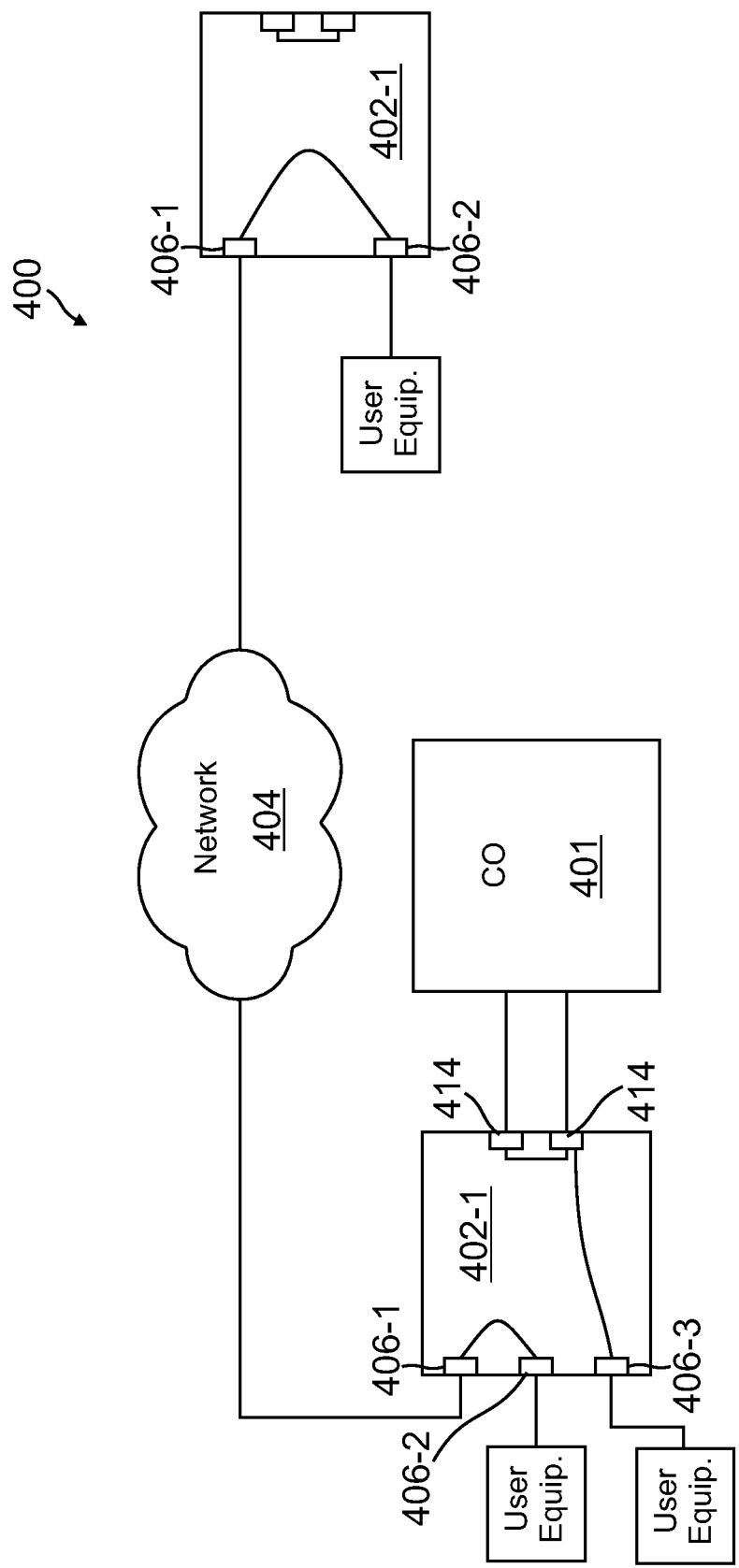
FIG. 4 is a high level block diagram of another embodiment of an exemplary communication system.

In embodiments in which the network 104 is implemented as an IP network, such as is shown in FIG. 4, a frame format such as the exemplary frame format 203 shown in FIG. 2C is used in some such embodiments. The frame format 203 is used for communicating over the Ethernet port and, thus, includes fields similar to those in frame format 200 or frame format 201. In addition, frame format 203 includes an IP header 222 and a user datagram protocol (UDP) header 224. The IP header 222 includes a source IP address 226, a destination IP address 228, and a header checksum 230 as known to one of skill in the art. The destination IP address 228 is used in routing the frame over the IP network. The UDP header 224 includes a source port number 232 and a destination port number 234 used in sending and receiving data over the network 104, as known to one of skill in the art. The source port number 232 and the destination port number 234 are defined when the emulated circuit is configured. The source port number 232 and the destination port number 234 are transport layer concepts and do not refer to a physical layer port, as understood by one of skill in the art.

Prior to configuring an emulated circuit, each of the communication units 102 is configured with a local address. The local address can be a local MAC address for emulated circuits over an Ethernet local area network (LAN) or a local MAC address together with a local IP address for communication over a wide area network (WAN) such as the internet. The local MAC address is typically preconfigured, such as during manufacture. Hence, a user typically does not need to configure the local MAC address. Other parameters to enable network communication, such as, but not limited to, default gateway, network mask, etc. are also configured, using techniques known to one of skill in the art. After configuring the local addresses and parameters, each of the respective communication units 102 is configured with information for each respective emulated circuit. For example, the local non-Ethernet user interface port, source address, and destination address are configured for each emulated circuit. Additional information which can be configured on a per emulated circuit basis includes, but is not limited to, source port and destination port for the UDP header. The local non-Ethernet user interface port refers to the port over which the communication unit receives data from user equipment to be transmitted over the Ethernet port.

In some embodiments, the communication unit is configured to couple all data received over the specified non-Ethernet user interface port to the Ethernet port for the emulated circuit. In other embodiments, the communication unit is configured to couple a specified number of time slots from each non-Ethernet frame to the Ethernet port for the emulated circuit. In some embodiments, such as embodiments enabling fractional lines described below, the other time slots not specified for the emulated circuit are encapsulated and forwarded over the DSL ports. For example, an E1 frame is 32 bytes long divided into 32 timeslots. Hence, in some such embodiments, a first portion of the 32 timeslots is coupled to the emulated circuit and the remaining portion of the 32 timeslots is coupled to the DSL ports for each 32 byte E1 frame. In other embodiments, the other time slots not specified for the emulated circuit are configured to be coupled to a second different emulated circuit. In yet other embodiments, the other time slots not specified for the emulated circuit are not used.

Each emulated circuit is also configured by associating the destination address and the emulated circuit ID with the emulated circuit. The destination address is the address of the other communication unit to which the data is being transmitted as discussed above. The data, such as the source/destination address, emulated circuit ID, timeslots, etc. associated with each emulated circuit can be stored in a look-up table, database, or other information file on a computer readable medium.

In operation, when the communication unit 102-1 receives an Ethernet frame over Ethernet user interface port 106-1, the communication units 102-1 analyzes the destination address to determine if the frame is directed to the communication unit 102-1. Based on the destination address, the communication unit determines if the frame should be forwarded over the DSL ports 114 and/or analyzed further to determine if the frame is associated with an emulated circuit. For example, if the destination address does not match the local address of the communication unit 102-1, the communication unit 102-1 forwards the frame over the DSL ports 114 in some embodiments. Additionally, even if the destination addresses match, the frame may be discarded if other parameters don't match such as the configured emulated circuit IDs, ports (e.g. UDP port), or payload sizes. If the destination address matches the local address of the communication unit 102-1, the communication unit 102-1 analyzes the source address and/or the emulated circuit ID to determine if the frame is associated with an emulated circuit. For example, the communication unit 102-1 compares the source address, destination address, and emulated circuit ID to the data stored for each emulated circuit to identify to which emulated circuit the frame belongs. Then, based on the identified emulated circuit, the communication unit 102-1 extracts the payload and outputs the data over the corresponding non-Ethernet user interface port 106.

In the reverse direction, when the communication unit 102-1 receives a signal over one of the non-Ethernet user interface ports 106, the communication unit 102-1 forwards the signal over the DSL links 114 and/or couples the signal to the Ethernet user interface port 106-1 based on the configuration of the communication unit 102-1. For example, the communication unit 102-1 can be configured to couple each signal received over the respective non-Ethernet user interface port to the Ethernet user interface port 106-1. Alternatively, the communication unit 102-1 can be configured to couple a predetermined subset of the timeslots in each frame received over the non-Ethernet user interface port to the Ethernet user interface port 106-1 and forward the remaining timeslots in a DSL frame transmitted over the DSL links 114 if another circuit is configured, e.g a fractional E1 to fractional E1 between a central unit and a remote unit. As discussed above, the timeslots coupled to the Ethernet user interface port 106-1 are encapsulated in an Ethernet frame containing the source/destination addresses and the emulated circuit ID in the header and then communicated over the Ethernet user interface port 106-1.

Furthermore, in some embodiments, fractional frames are supported. As used herein, a fractional frame is a frame in which less than the total number of available timeslots in the frame are used for carrying user data. For example, in embodiments using the E1 protocol, the fractional E1 frame contains 32 timeslots, but less than 32 timeslots are used for carrying data. The timeslots not used are also referred to herein as empty timeslots. In some such embodiments, an emulated circuit is configured to couple two or more fractional frames received at a first communication unit with a single port in another communication unit.

For example, communication unit 302-1 in exemplary system 300 of FIG. 3 includes two G.703 user ports 306-2 and 306-3. Each of the G.703 user ports 306-2 and 306-3 is configured to receive fractional frames. The communication unit 302-1 is configured to extract the timeslots containing data from each of the received fractional frames. For example, in the embodiment of FIG. 3, user port 306-2 is configured to receive a fractional E1 frame using 15 of the available 32 timeslots and user port 306-3 is configured to receive a fractional E1 frame using 10 of the available 32 timeslots. It is to be understood that the number of timeslots used is provided by way of example only and that the number of timeslots in fractional frames varies based on the specific implementation.

The communication unit 302-1 extracts the corresponding timeslots containing data and encapsulates the timeslots from both G.703 user interface ports 306-2/306-3 with an Ethernet header having an emulated circuit ID field. The Ethernet frame is then output via Ethernet user interface port 306-1 and transmitted over the network 304 to communication unit 302-2. Communication unit 302-2 removes the Ethernet header and generates an E1 signal containing the received timeslots and outputs the E1 signal over the G.703 user interface port 306-2. In the reverse direction, communication unit 302-2 transmits E1 timeslots encapsulated with an Ethernet header to communication unit 302-1. Communication unit 302-1 removes the Ethernet header and separates the received timeslots. In particular, in this example, communication unit 302-1 generates a first fractional E1 signal with the first 15 received timeslots and a second fractional E1 signal with the next 10 received timeslots. The first fractional E1 signal is output over the user port 306-2 and the second fractional E1 signal is output over the user port 306-3. Further details regarding fractional frames are discussed in co-pending U.S. patent application Ser. No. 12/468,562 and co-pending U.S. patent application Ser. No. 12/468,552, both of which are incorporated herein by reference.

In some embodiments, such as in the exemplary system 400 shown in FIG. 4, only a subset of the non-Ethernet user interface ports are configured for an emulated circuit. For example, in FIG. 4, non-Ethernet user port 406-2 is configured according to an Nx64k protocol and non-Ethernet user port 406-3 is configured according to a G.703 protocol. User port 406-2 is configured for an emulated circuit, as described above, in which timeslots are extracted from the Nx64k signal and encapsulated with an Ethernet header to generate an Ethernet signal. The Ethernet signal is then output over Ethernet user port 406-1. The user port 406-3, however, is not configured for an emulated circuit in the example of FIG. 4. Thus, signals received over the user port 406-3 are configured for transport over DSL ports 414. In particular, the communication unit 402-1 maps timeslots received in the G.703 signal to timeslots in a DSL frame for transport over DSL ports 414. Additional details regarding mapping of timeslots to a DSL frame are discussed in U.S. patent application Ser. No. 12/468,562 and co-pending U.S. patent application Ser. No. 12/468,552.

Figure 5:
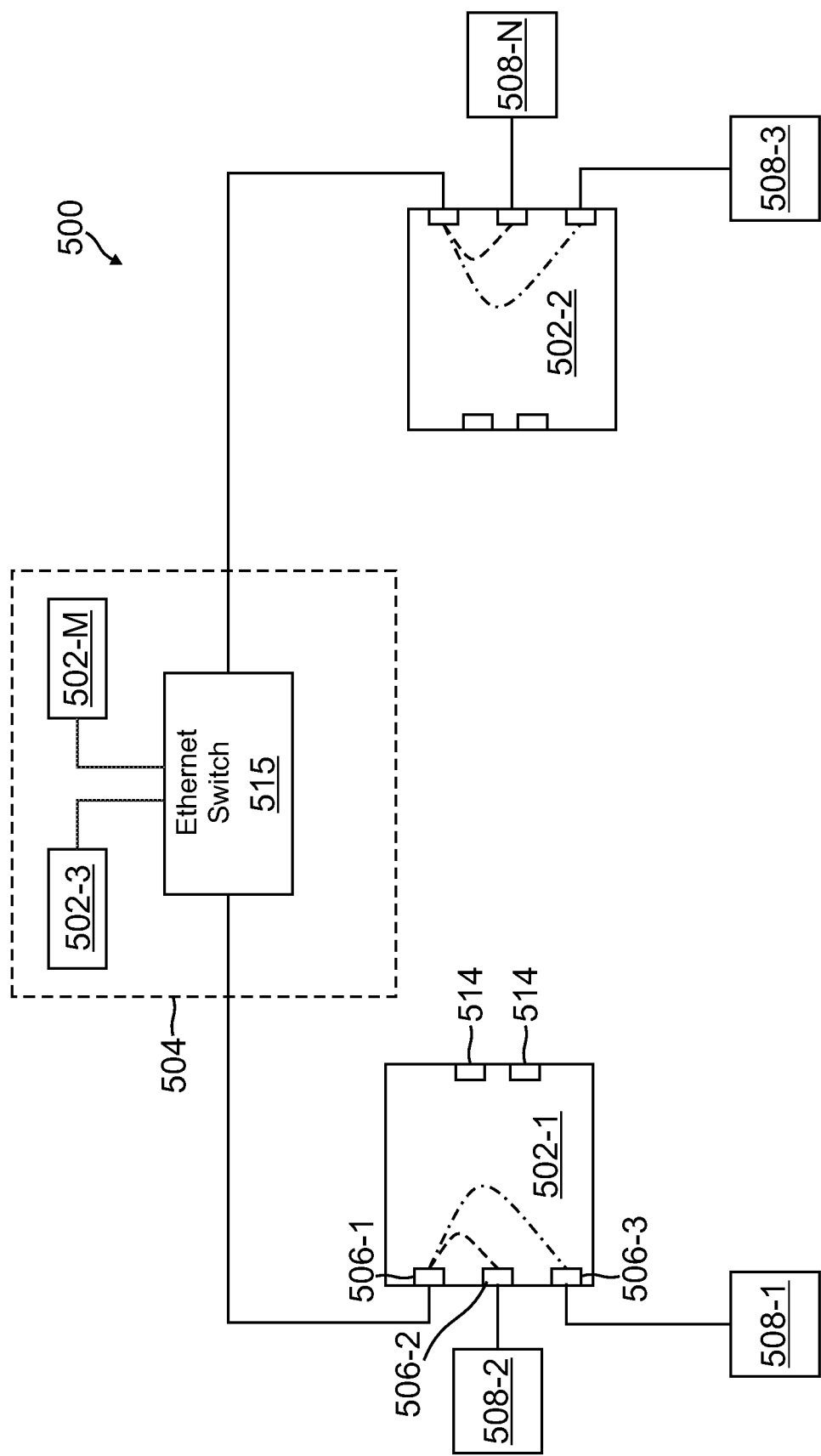
FIG. 5 is a high level block diagram of another embodiment of an exemplary communication system.

As discussed above, the network 104 can be implemented using different network technologies. For example, in FIG. 5, network 504 is implemented as a local area network (LAN) including at least one Ethernet switch 515. Hence, the range of distance between communication units 502-1 and 502-2 is limited geographically based on the physical infrastructure of the LAN.

Figure 6:
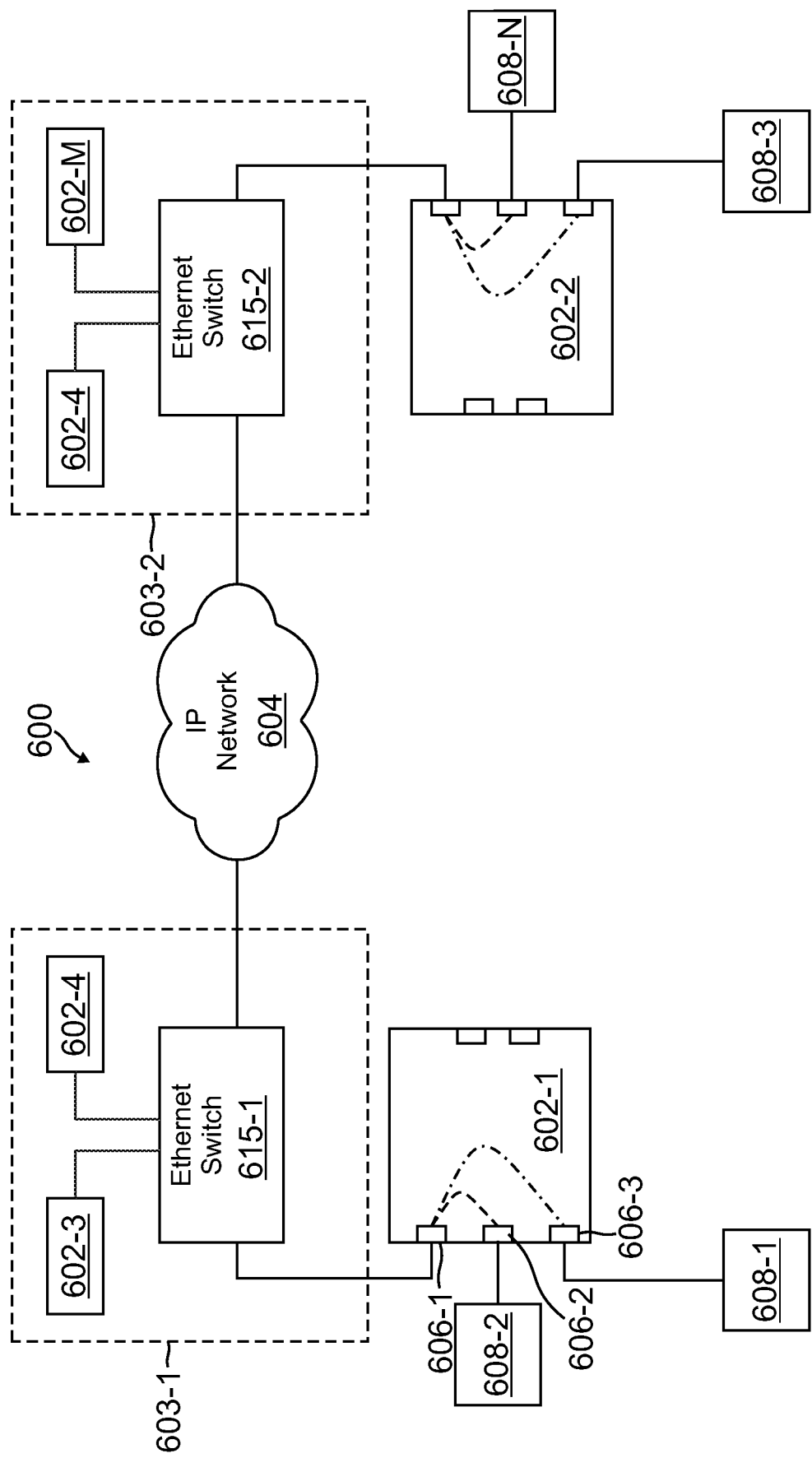
FIG. 6 is a high level block diagram of another embodiment of an exemplary communication system.

In the exemplary alternative embodiment of FIG. 6, the network 604 is an internet protocol (IP) network over which local area networks 603-1 and 603-2 are communicatively coupled. The geographical range of the distance between communication units 602-1 and 602-2 is limited, in such embodiments, only by the limits of internet availability. The frame format and configuration of the emulated circuit in the embodiments of FIGS. 5 and 6 change based on the implementation of network 104 as discussed above.

Figure 7:
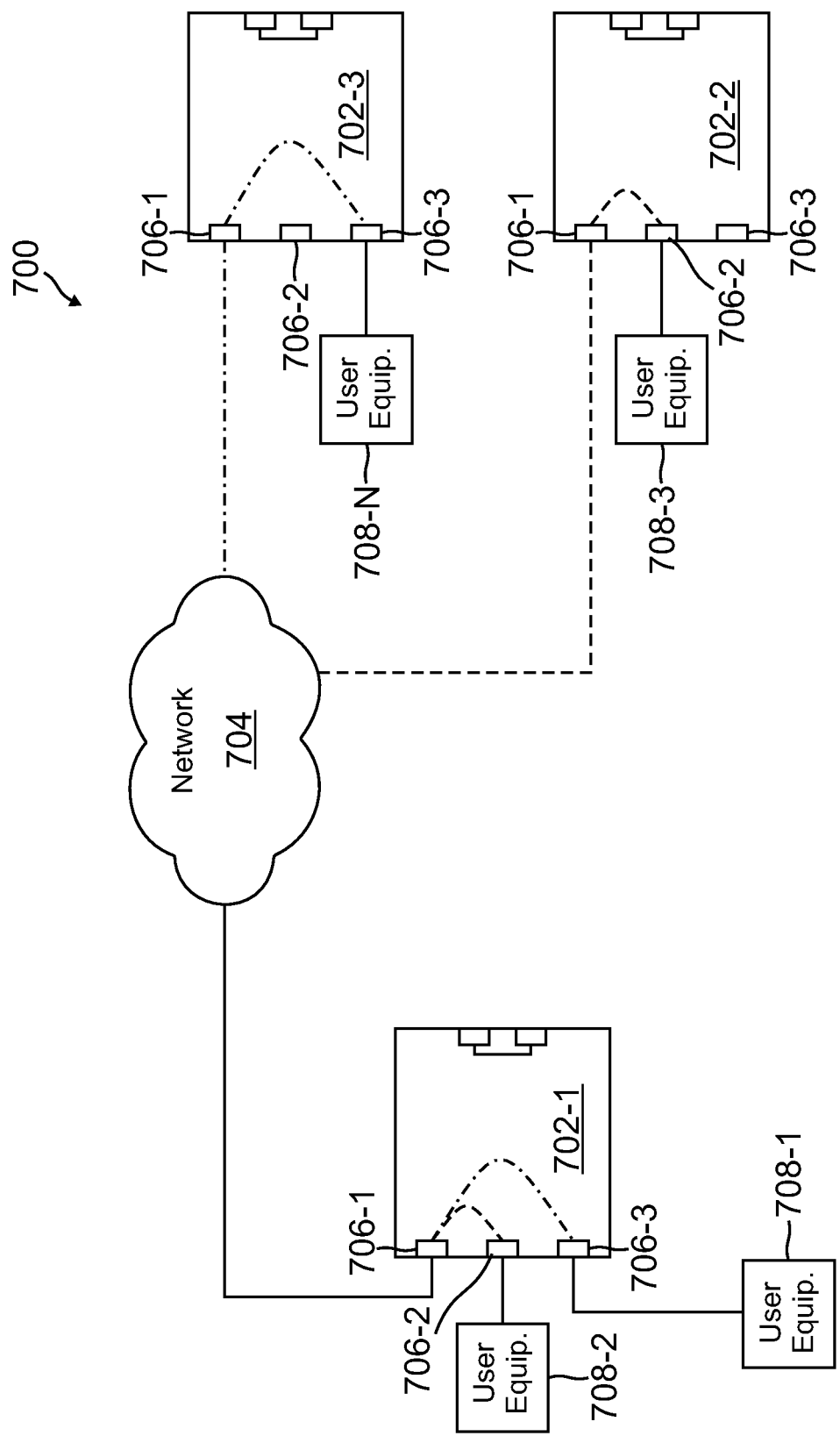
FIG. 7 is a high level block diagram of another embodiment of an exemplary communication system.

Additionally, as shown in the exemplary system 700 in FIG. 7, in some embodiments, each emulated circuit can be configured between different communication units 702. For example, in the embodiment of FIG. 7, a first emulated circuit is configured between user interface port 706-2 in communication unit 702-1 and user interface port 706-2 in communication unit 702-2. A second emulated circuit is configured between user interface port 706-3 in communication unit 702-1 and user interface port 706-3 in communication unit 702-3.

Figure 8:
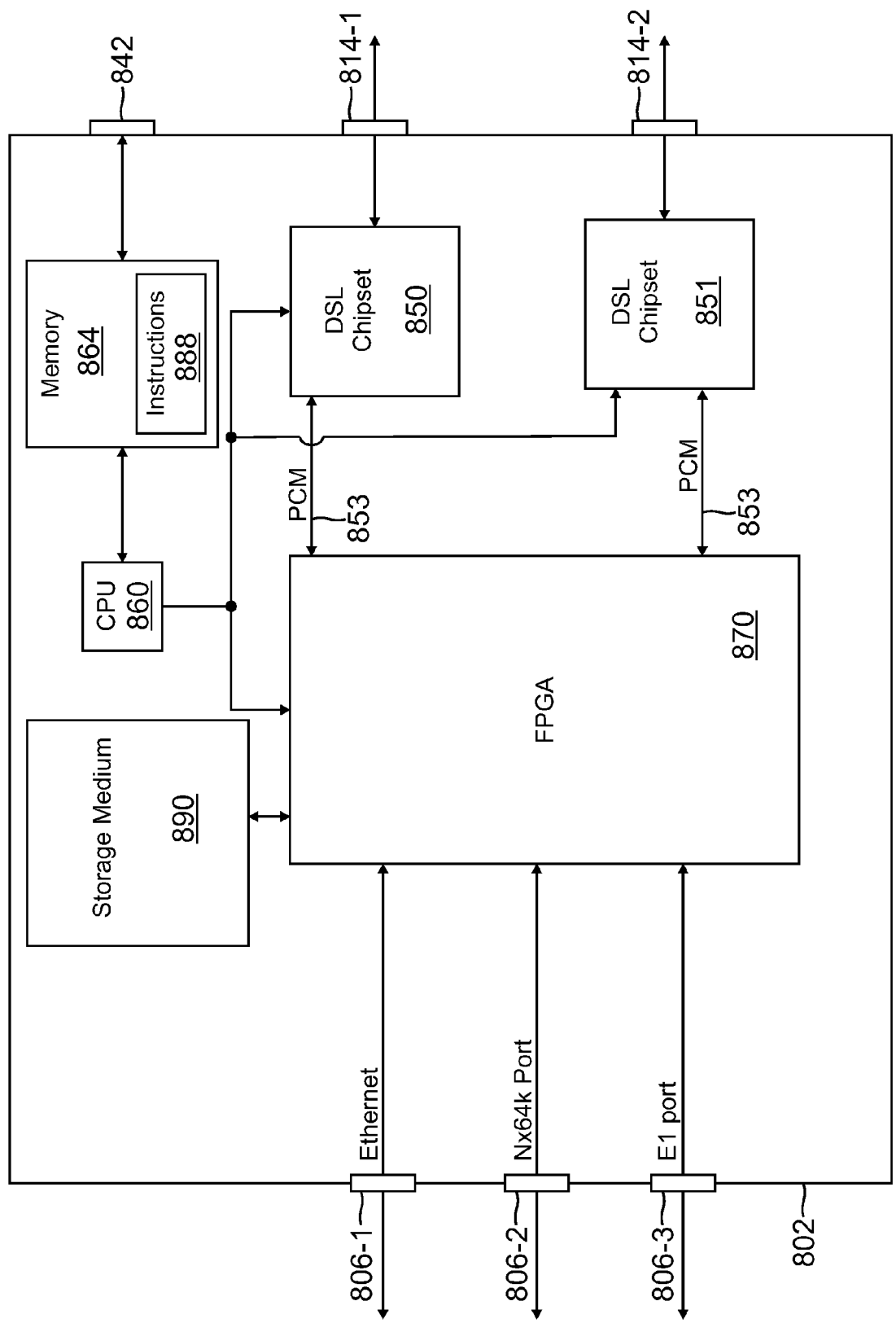
FIG. 8 is a block diagram of one embodiment of an exemplary communication unit.

FIG. 8 is a block diagram of one embodiment of an exemplary communication unit 802 (also referred to as a DSL unit 802 in this example). DSL unit 802 can be used in a communication network such as networks 100, 300, 400, 500, 600, and 700. DSL unit 802 includes a plurality of different types of application or user ports 806. Specifically, in this example, there are three user ports on the user interface side of the DSL unit 802. As described above, at least one of the user ports is configured for an Ethernet format. In this example, user port 806-1 is configured for an Ethernet format. Each of the non-Ethernet ports are configured according to a Time Division Multiplex (TDM) protocol, such as an Nx64k protocol or a G.703 protocol. In this example, user port 806-2 is configured according to an Nx64k protocol and user port 806-3 is configured according to a G.703 protocol. It is to be understood that number and type of user ports is provided by way of example and not by way of limitation. For example, it is to be understood that in other embodiments, one or more than two non-Ethernet ports are used. In addition, it is to be understood that in other embodiments, more than one Ethernet port, more than one Nx64k port, and/or more than one G.703 port can be used.

The DSL unit 802 also includes, in this example, two DSL ports 814-1 and 814-2, each coupled to a DSL pair. The input received over each DSL port 814 is sent to a respective DSL chipset 850 or 851. In this embodiment, DSL ports 814 are configured according to the Global.Standard High-Bit-Rate Digital Subscriber Line (G.SHDSL), defined in the ITU G.991.2 standard. However, it is to be understood that other DSL variants can be used in other embodiments. Each DSL port 814 is coupled to a central office via a single pair. The DSL chipsets 850 and 851 are coupled to a custom field programmable gate array (FPGA) 870 via a respective a pulse code modulation (PCM) interface 853. Notably, although an FPGA is used in this example, it is to be understood that other embodiments are not so limited. For example, in other embodiments, an application specific integrated circuit (ASIC) is used.

In some embodiments, each DSL chipset 850 and 851 is configured to pull out a range of timeslots in a signal received from FPGA 870 via PCM 853. For example, in one embodiment, DSL chipset 850 is configured to pull out and operate on timeslots 1-15 while DSL chipset 851 is configured to pull out and operate on timeslots 16-31. In such embodiments, a different portion of the signal received via PCM 853 is output via each DSL port 814-1 and 814-2. In other embodiments, the DSL chipsets 850 and 851 are configured to operate in a 1+1 protection mode. In such embodiments, the entire signal received via PCM 853 is output over both DSL ports 814-1 and 814-2. Hence, one of the DSL ports, in such embodiments, is designated as the active DSL port and the other DSL port provides back-up in case a fault occurs on the active DSL port.

The user ports 806 and the DSL ports 814 are connected via the FPGA 870 and the DSL chipsets 850 and 851. The FPGA 870 and the DSL chipsets 850 and 851 are controlled by a processing unit 860, which is responsible for configuration, status and error handling of the DSL unit 802. The FPGA 870 is the functional block responsible for handling timeslot allocation, and switching of timeslots between interface formats of the plurality of user interface ports 806 for connection of the emulated circuits. The FPGA 870 is coupled to a storage medium 890. The storage medium 890 is configured to provide a buffer for each emulated circuit. As discussed above, the DSL unit 802 is configured to enable both communicating data over the DSL ports 814 and over an emulated circuit via Ethernet user interface port 802-1. The amount of buffer space allocated to each emulated circuit is configurable. For example, in one embodiment, the default buffer size for each emulated circuit is 4 times the size of the emulated circuited. For example, if an emulated circuit has 32 E1 timeslots, the default buffer size would be 128 timeslots. Hence, for such embodiments, outgoing Ethernet packets include 4 E1 frames per packet which helps network efficiency versus sending 4 packets, one for each E1 frame. Similarly, for Nx64k data, the default buffer size is also 4 times the size of the emulated circuit, in some embodiments. Since Nx64k is unframed, the default buffer size ranges between 32-784 Kbits/second for respective emulated circuit sizes of 8-196 Kbits/second.

A user configures the emulated circuit and operation of the DSL unit 802 via a user interface 842. For example, a user can configure the source address, destination address, and emulated circuit ID for each emulated circuit via the user interface 842. The configuration data associated with each emulated circuit is stored in a memory 864. For example, if an IP network is used for the circuit emulation, a user configures the DSL unit 802 with an IP address, default gateway, and subnet mask via the user interface 842. Alternatively, the address configuration can be done automatically using the Dynamic Host Configuration Protocol (DHCP). The configuration of a local MAC address is typically pre-configured, as discussed above.

Once the DSL unit 802 is configured with the local IP address and/or MAC address, a user configures each emulated circuit via the user interface 842. For example, an emulated circuit can be configured between the G.703 user interface port 806-3 and the Ethernet user interface port 806-1 and/or between the Nx64k user interface port 806-2 and the Ethernet user interface port 806-1.

In configuring the G.703 user interface port 806-3 for an emulated circuit connection, the user configures the G.703 user interface port 806-3 for either structured or unstructured operation (also referred to as framed or unframed, respectively). The structured mode is a frame format having a specified length for the timeslots. The unstructured mode is a continuous bit stream of 2 Mbits/second. Hence, for unstructured mode, each 2 Mbits/second bit stream is mapped directly into a corresponding 32 timeslot Ethernet frame.

For the structured mode of operation, the user can enable or disable CRC-4 which is a checksum for error checking in timeslot 0 using a superframe, as known to one of skill in the art. In some embodiments, the default selection is to disable CRC-4. In addition, for the structured mode of operation, more control over timeslot mapping is permitted. For example, the user can configure all of the timeslots in each received G.703 frame for the emulated circuit. Alternatively, the user can configure a subset of the timeslots in each frame for the emulated circuit and the other timeslots for transport over DSL ports 814. In configuring an Nx64k emulated circuit, the user specifies port data rate.

In configuring each emulated circuit for an IP network implementation, the user configures the source and destination UDP numbers as discussed above. The user also configures the source and destination IP addresses. The destination IP address is the IP address of the other DSL unit to which the Ethernet frame is being transmitted. The source IP address is the local IP address of the DSL unit 802. In addition, the user can optionally configure differentiated services priority and/or payload size. The other DSL unit to which the Ethernet frame is transmitted to complete the emulated circuit is also configured similarly to the DSL unit 802. For example, for the other DSL unit, the source IP address is the IP address of the other DSL unit and the destination IP address is the local IP address of the DSL unit 802.

In configuring the Ethernet encapsulation parameters for each emulated circuit, the user configures an emulated circuit ID to identify the respective emulated circuit, as discussed above. In addition, the user configured the destination MAC address which is the MAC address of the other DSL unit to which the Ethernet frame is transmitted. The user can also optionally enter a range of timeslots for timeslot mapping in structured mode, configure Ethernet class of service, and/or specify a payload size.

Figure 9:
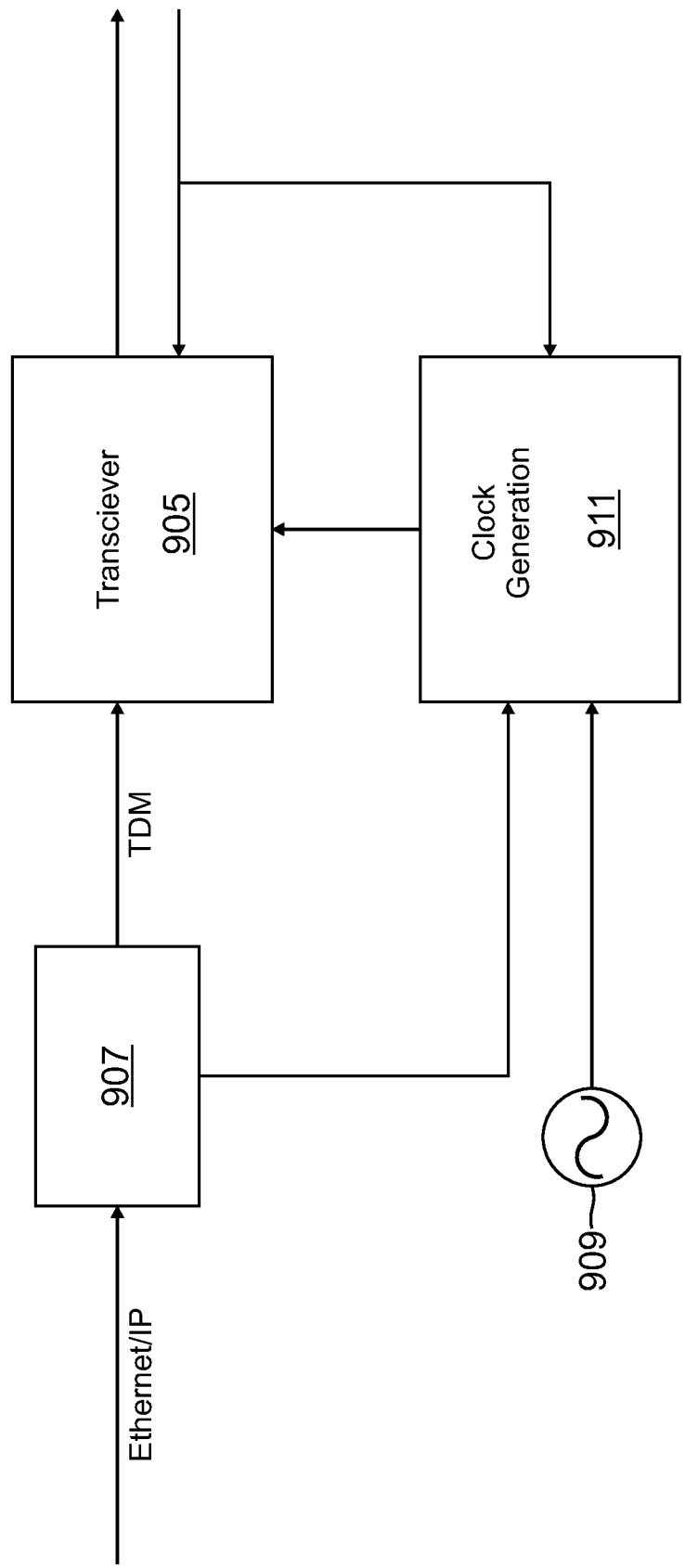
FIG. 9 depicts exemplary embodiments of timing configurations for a communication unit.

In addition, for each emulated circuit, the user configures the timing options. In particular, the user configures one of adaptive timing, internal timing, or loop timing. FIG. 9 is a block diagram depicting each of the above exemplary timing options. In particular, FIG. 9 depicts a TDM transceiver 905 in a TDM port, a buffer or queue 907, a local oscillator 909 and a clock generator 911. When the Ethernet/IP packets are received, the TDM data is extracted and placed in the buffer 907. The TDM transceiver 905 empties the buffer 907 for transmission over the TDM link based on a clock signal from the clock generator 911. For internal timing, a signal from the local oscillator 909 is input to the clock generator 911 for generating the clock signal. For loop timing, the timing of received TDM frames is used as an input to the clock generator 911 for generating the clock signal used by the TDM transceiver 905. For adaptive timing, the timing of the clock signal is adjusted up or down depending on the fill level of the buffer 907. If the buffer 907 begins to fill up beyond a predetermined level, the clock frequency is adjusted to increase the rate of emptying the buffer 907. If the buffer 907 nbegins to empty below the predetermined level, the clock frequency is adjusted to decrease the rate of emptying the buffer 907. In this manner, the buffer is maintained at a desired level. The buffer 907 also helps minimize jitter in the transmission of the TDM data.

Returning to FIG. 8, the processing unit 860 is communicatively coupled to the memory 864. The memory 864 also includes instructions 888 for execution by the processing unit 860 in this example. These instructions are typically stored on any appropriate computer readable medium used for storage of computer readable instructions or data structures. The computer readable medium can be implemented as any available media that can be accessed by a general purpose or special purpose computer or processor, or any programmable logic device. Suitable processor-readable media may include storage or memory media such as magnetic or optical media. For example, storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc. Suitable processor-readable media may also include transmission media such as electrical, electromagnetic, or digital signals, conveyed via a communication medium such as a network and/or a wireless link.

The processing unit 860 executes instructions 888 that cause the processing unit 860 to perform at least some of the processing described herein. For example, the instructions 888 direct processing unit 860 in configuring the FPGA 870 for the emulated circuit according to the user supplied data. The processing unit 860 also executes the instructions 888 for configuring the FPGA 870 for timeslot mapping and coupling data to the DSL chipsets 850 and 851 based on user input. In some implementations, the processing unit 860 comprises a microprocessor or microcontroller. Moreover, although the processing unit 860 and memory 864 are shown as separate elements in FIG. 8, it is to be understood that, in some implementations, the processing unit 860 and memory 864 are implemented in a single device (for example, a single integrated-circuit device). In addition, in some embodiments, the processing unit 860 comprises processor support chips and/or system support chips such as ASICs.

FIG. 10 is a flow chart depicting one embodiment of a method 1000 of communicating data in a communication system. It is to be understood that method 100 is presented by way of example and that the order of the individual acts is not to be limited by the order in which the acts are described. Method 1000 can be implemented in a DSL communication unit such as communication unit 802 discussed above. At block 1002, an Ethernet signal is received over an Ethernet user port in the DSL communication unit. At block 1004, the communication unit determines if the Ethernet signal is associated with an emulated circuit. For example, the communication unit analyzes the source address, destination address, and/or emulated circuit ID, as described above, to determine if the Ethernet signal is associated with an emulated circuit.

If the Ethernet signal is associated with an emulated circuit, the communication unit extracts data from a payload of the Ethernet signal at block 1006. The extracted data is then output over a non-Ethernet user port associated with the emulated circuit at block 1008. The non-Ethernet user port is implemented in some embodiments as one of an Nx64k port or a G.703 port, as discussed above. Furthermore, in some embodiments, a first portion of data is extracted from the Ethernet signal and output via a first non-Ethernet user port. A second portion of data is also extracted from the Ethernet signal and output via a second non-Ethernet user port in such embodiments.

If the Ethernet signal is not associated with an emulated circuit, the communication unit determines, at block 1010, whether the Ethernet signal is to be output over at least one DSL port at block 1012 or discarded at block 1014. For example, the communication unit can determine when to discard or forward the data on the DSL port based on parameters such as the source and destination address in the Ethernet signal header. If the Ethernet signal is output over the at least one DSL port at block 1012, the received Ethernet signal is stripped of the sync and the start of frame bytes. The stripped Ethernet frame is then high-level data link control (HDLC) encoded. HDLC encoding involves appending a two byte cyclic redundancy check (CRC) using the polynomial X16+X12+X5+1. The Ethernet frame plus CRC is then examined for a continuous bit sequence of five 1's (that is, 11111). A zero is inserted at the end of each sequence of five 1's (that is, 111110). HDLC flags with the pattern "01111110" are also inserted at the beginning and end of the frame. Zero insertion after a sequence of five is in the payload is used to avoid confusion of payload with HDLC flags. The HDLC flags are used to identify the start and end of a frame. The HDLC encoded Ethernet frame is then inserted into timeslots of a DSL frame and output over the at least one DSL port.

At block 1016, a non-Ethernet signal is received over the non-Ethernet user port. At block 1018, data is extracted from the non-Ethernet signal. At block 1020, the extracted data is encapsulated in an Ethernet frame having a respective emulated circuit identification. If an internet protocol network is implemented, encapsulating the extracted data in an Ethernet frame includes encapsulating the Ethernet frame in an internet protocol packet having an internet protocol header. At block 1022, the Ethernet frame is output over the Ethernet user port.

In some embodiments, the non-Ethernet user port is configured to transmit and receive signals according to a structured G.703 protocol having predetermined timeslots in a G.703 frame. In some such embodiments, extracting data from the non-Ethernet signal includes extracting a first set of timeslots and a second set of timeslots from the structured G.703 signal. Encapsulating the data in such embodiments includes encapsulating the first set of timeslots in an Ethernet frame and inserting the second set of timeslots into a DSL frame. The Ethernet frame is then output over the Ethernet user port and the DSL frame is output over at least one DSL port. In addition, in some embodiments implementing a structured G.703 protocol, fractional frames are received and processed, as discussed above.

Hence, the communication unit operates as both a DSL unit and as a unit for connecting one or more emulated circuits.

Exemplary Embodiments Section

Example 1 includes a digital subscriber line (DSL) unit comprising: a first user port configured to transmit and receive signals according to an Ethernet protocol; a second user port configured to transmit and receive signals according to a second protocol, wherein the second protocol is different from the Ethernet protocol; at least one DSL port configured to transmit and receive signals according to a DSL protocol; and a processing device configured to analyze Ethernet signals received over the first user port to determine when to output data from the respective received Ethernet signals over the second user port and when to output data from the respective received Ethernet signals over the at least one DSL port; wherein the processing device is further configured to extract data from signals received over the second user port and insert the extracted data into a corresponding Ethernet signal having a respective emulated circuit identification and to output the corresponding Ethernet signal over the first user port.

Example 2 includes the DSL unit of Example 1, further comprising: a third user port configured to transmit and receive signals according to a third protocol, wherein the third protocol is different from the Ethernet protocol and the second protocol; wherein the processing device is further configured to analyze the Ethernet signals received over the first user port to determine when to output data from the respective received Ethernet signals over the second user port, when to output data from the respective received Ethernet signals over the at least one DSL port, and when to output data from the respective received Ethernet signals over the third user port Example 3 includes the DSL unit of Example 2, wherein the second protocol is one of an Nx64k protocol and a G.703 protocol; and wherein the third protocol is one of an Nx64k protocol and a G.703 protocol.

Example 4 includes the DSL unit of any of Examples 2-3, wherein the processing device is configured to determine when to output a first portion of data in the respective received Ethernet signals over the second port and a second portion of data from the respective received Ethernet signals over the third user port based on a respective emulated circuit identification in a header of the respective received Ethernet signals.

Example 5 includes the DSL unit of Example 1, wherein the second protocol is a G.703 protocol.

Example 6 includes the DSL unit of Example 5, wherein the second protocol is a structured G.703 protocol having predefined timeslots in a G.703 frame.

Example 7 includes the DSL unit of Example 6, wherein the processing device is configured to extract the timeslots from each received G.703 frame, to insert a first portion of the extracted timeslots from each G.703 frame into a corresponding Ethernet signal having a respective emulated circuit identification and to insert a second portion of the extracted timeslots from each G.703 frame into a corresponding DSL frame.

Example 8 includes the DSL unit of any of Examples 1 and 5-7, further comprising a third user port configured to transmit and receive signals according to the second protocol.

Example 9 includes the DSL unit of Example 8, wherein the second protocol is a structured G.703 protocol having predefined timeslots in a G.703 frame; wherein each of the second and third ports receive fractional G.703 frames in which only a first portion of the timeslots in each respective fractional G.703 frame contains data.

Example 10 includes the DSL unit of Example 9, wherein the processing device is configured to extract first portion of timeslots from a fractional G.703 frame received via the second user port and a first portion of timeslots from a fractional G.703 frame received via the third user port; wherein the processing device is further configured to insert the first portion of timeslots from the fractional G.703 frame received via the second user port and the first portion of timeslots from the fractional G.703 frame received via the third user port into a single corresponding Ethernet signal having a respective emulated circuit identification and to output the corresponding Ethernet signal over the first user port.

Example 11 includes a communication system comprising: a first node having a plurality of user interface ports and at least one digital subscriber line (DSL) port; wherein one of the plurality of user interface ports is configured according to an Ethernet protocol and one or more of the plurality of user interface ports is a non-Ethernet user interface port configured according to a protocol different from the Ethernet protocol; a second node having a plurality of user interface ports and at least one DSL port; wherein one of the plurality of user interface ports is configured according to an Ethernet protocol and one or more of the plurality of user interface ports is a non-Ethernet user interface port configured according to a protocol different from the Ethernet protocol; wherein the Ethernet user interface port in the first node is coupled to the Ethernet user interface port in the second node via a network to form an emulated circuit between one of one or more non-Ethernet ports in the first node and a respective non-Ethernet port in the second node; wherein the first node is configured to extract data from signals received from the second node via the Ethernet user interface port and to output the extracted data via the non-Ethernet user interface port associated with the emulated circuit; wherein the second node is configured to extract data from signals received from the first node via the Ethernet user interface port and to output the extracted data via the non-Ethernet user interface port associated with the emulated circuit; wherein when the first node receives other signals via the Ethernet user interface port that are not from the second node, the first node is configured to determine when to output the respective other signals via the at least one DSL port; and wherein when the second node receives other signals via the Ethernet user interface port that are not from the first node, the second node is configured to determine when to output the respective other signals via the at least one DSL port.

Example 12 includes the communication system of Example 11, wherein the Ethernet user interface port in the first node is coupled to the Ethernet user interface port in the second node via a local Ethernet network.

Example 13 includes the communication system of any of Examples 11-12, wherein the Ethernet user interface port in the first node is coupled to the Ethernet user interface port in the second node via an Ethernet network and an Internet Protocol Network.

Example 14 includes the communication system of any of Examples 11-13, wherein the non-Ethernet user interface port in the first node is configured according to one of an Nx64k protocol and a G.703 protocol; and wherein the non-Ethernet user interface port in the second node is configured according to one of an Nx64k protocol and a G.703 protocol.

Example 15 includes the communication system of Example 14, wherein the non-Ethernet user interface port in the each of the first and second nodes is configured according to a framed G.703 protocol having predefined timeslots in a G.703 frame.

Example 16 includes the communication system of Example 15, wherein the first node is configured to extract data in the timeslots from each received G.703 frame, to insert a first portion of the extracted timeslot data from each G.703 frame into a corresponding Ethernet signal having a respective emulated circuit identification and to insert a second portion of the extracted timeslot data from each G.703 frame into a corresponding DSL frame.

Example 17 includes the communication system of any of Examples 15-16, wherein the non-Ethernet user interface port in each of the first node and the second node is configured to transmit and receive fractional G.703 frames in which only a portion of the timeslots in each respective fractional G.703 frame contains data.

Example 18 includes a method of communicating data in a communication system, the method comprising: receiving an Ethernet signal over an Ethernet user port in a digital subscriber line (DSL) communication unit; determining if the Ethernet signal is associated with an emulated circuit; if the Ethernet signal is associated with an emulated circuit: extracting data from a payload of the Ethernet signal; and outputting the extracted data over a non-Ethernet user port associated with the emulated circuit, the non-Ethernet user port configured to transmit and receive signals according to a protocol different from an Ethernet protocol; and if the Ethernet signal is not associated with an emulated circuit: outputting the Ethernet signal in a DSL frame over at least one DSL port; or discarding the Ethernet signal.

Example 19 includes the method of Example 18, further comprising: receiving a non-Ethernet signal over the non-Ethernet user port; extracting data from the non-Ethernet signal; encapsulating the extracted data in an Ethernet frame having a respective emulated circuit identification; and outputting the Ethernet frame over the Ethernet user port.

Example 20 includes the method of Example 19, wherein encapsulating the extracted data in the Ethernet frame further comprises encapsulating the Ethernet frame in an internet protocol packet having an internet protocol header.

Example 21 includes the method of any of Examples 18-20, wherein the non-Ethernet user port associated with the emulated circuit is configured to transmit and receive signals according to a structured G.703 protocol, the method further comprising: receiving a structured G.703 signal over the non-Ethernet user port; extracting a first set of timeslots from the structured G.703 signal; extracting a second set of timeslots from the structured G.703 signal; encapsulating the first set of timeslots in an Ethernet frame having a respective emulated circuit identification; inserting the second set of timeslots into a DSL frame; outputting the Ethernet frame over the Ethernet user port; and outputting the DSL frame over at least one DSL port.

Example 22 includes the method of any of Examples 18-21, wherein extracting data from a payload of the Ethernet signal comprises extracting a first portion of data from the payload and extracting a second portion of data from the payload; and wherein outputting the extracted data over a non-Ethernet user port associated with the emulated circuit comprises outputting the first portion of extracted data over a first non-Ethernet user port and outputting the second portion of extracted data over a second non-Ethernet user port, each of the first and second non-Ethernet user ports configured to transmit and receive signals according to a respective protocol different from an Ethernet protocol.

Although specific embodiments have been illustrated and described herein, it will be appreciated by those of ordinary skill in the art that any arrangement, which is calculated to achieve the same purpose, may be substituted for the specific embodiments shown. For example, in some embodiments, the non-Ethernet port is a DSL port. Thus, an emulated circuit is configured to emulate DSL frames over Ethernet. In some such embodiments, the DSL interface is divided into a number of pairs and the DSL frame format is divided into 4 DSL blocks. The DSL circuit emulation outputs a single DSL block plus the block overhead in a single Ethernet or IP frame. Hence, in such embodiments, 4 Ethernet or IP frames are needed to send the complete DSL frame. However, the number of Ethernet packets required depends on the number of DSL pairs configured for the emulated circuit. Each Ethernet packet contains a single block from each DSL pair in sequential order. A DSL payload header at the start of the DSL frame defines the DSL block size, number of pairs, block number, etc. Therefore, it is manifestly intended that this invention be limited only by the claims and the equivalents thereof.

What is claimed is:

1. A digital subscriber line (DSL) unit comprising:
a first user port configured to transmit and receive signals according to an Ethernet protocol;
a second user port configured to transmit and receive signals according to a second protocol, wherein the second protocol is different from the Ethernet protocol;
at least one DSL port configured to transmit and receive signals according to a DSL protocol; and
a processing device configured to analyze Ethernet signals received over the first user port to determine when to output data from the respective received Ethernet signals over the second user port and when to output data from the respective received Ethernet signals over the at least one DSL port;
wherein the processing device is further configured to extract data from signals received over the second user port and insert the extracted data into a corresponding Ethernet signal having a respective emulated circuit identification and to output the corresponding Ethernet signal over the first user port.

2. The DSL unit of claim 1, further comprising:
a third user port configured to transmit and receive signals according to a third protocol, wherein the third protocol is different from the Ethernet protocol and the second protocol;
wherein the processing device is further configured to analyze the Ethernet signals received over the first user port to determine when to output data from the respective received Ethernet signals over the second user port, when to output data from the respective received Ethernet signals over the at least one DSL port, and when to output data from the respective received Ethernet signals over the third user port.

3. The DSL unit of claim 2, wherein the second protocol is one of an Nx64k protocol and a G.703 protocol; and
wherein the third protocol is one of an Nx64k protocol and a G.703 protocol.

4. The DSL unit of claim 2, wherein the processing device is configured to determine when to output a first portion of data in the respective received Ethernet signals over the second port and a second portion of data from the respective received Ethernet signals over the third user port based on a respective emulated circuit identification in a header of the respective received Ethernet signals.

5. The DSL unit of claim 1, wherein the second protocol is a G.703 protocol.

6. The DSL unit of claim 5, wherein the second protocol is a structured G.703 protocol having predefined timeslots in a G.703 frame.

7. The DSL unit of claim 6, wherein the processing device is configured to extract the timeslots from each received G.703 frame, to insert a first portion of the extracted timeslots from each G.703 frame into a corresponding Ethernet signal having a respective emulated circuit identification and to insert a second portion of the extracted timeslots from each G.703 frame into a corresponding DSL frame.

8. The DSL unit of claim 1, further comprising a third user port configured to transmit and receive signals according to the second protocol.

9. The DSL unit of claim 8, wherein the second protocol is a structured G.703 protocol having predefined timeslots in a G.703 frame;
wherein each of the second and third ports receive fractional G.703 frames in which only a first portion of the timeslots in each respective fractional G.703 frame contains data.

10. The DSL unit of claim 9, wherein the processing device is configured to extract first portion of timeslots from a fractional G.703 frame received via the second user port and a first portion of timeslots from a fractional G.703 frame received via the third user port;
wherein the processing device is further configured to insert the first portion of timeslots from the fractional G.703 frame received via the second user port and the first portion of timeslots from the fractional G.703 frame received via the third user port into a single corresponding Ethernet signal having a respective emulated circuit identification and to output the corresponding Ethernet signal over the first user port.

11. A communication system comprising:
a first node having a plurality of user interface ports and at least one digital subscriber line (DSL) port; wherein one of the plurality of user interface ports is configured according to an Ethernet protocol and one or more of the plurality of user interface ports is a non-Ethernet user interface port configured according to a protocol different from the Ethernet protocol;
a second node having a plurality of user interface ports and at least one DSL port; wherein one of the plurality of user interface ports is configured according to an Ethernet protocol and one or more of the plurality of user interface ports is a non-Ethernet user interface port configured according to a protocol different from the Ethernet protocol;
wherein the Ethernet user interface port in the first node is coupled to the Ethernet user interface port in the second node via a network to form an emulated circuit between one of one or more non-Ethernet ports in the first node and a respective non-Ethernet port in the second node;
wherein the first node is configured to extract data from signals received from the second node via the Ethernet user interface port and to output the extracted data via the non-Ethernet user interface port associated with the emulated circuit;
wherein the second node is configured to extract data from signals received from the first node via the Ethernet user interface port and to output the extracted data via the non-Ethernet user interface port associated with the emulated circuit;
wherein when the first node receives other signals via the Ethernet user interface port that are not from the second node, the first node is configured to determine when to output the respective other signals via the at least one DSL port; and
wherein when the second node receives other signals via the Ethernet user interface port that are not from the first node, the second node is configured to determine when to output the respective other signals via the at least one DSL port.

12. The communication system of claim 11, wherein the Ethernet user interface port in the first node is coupled to the Ethernet user interface port in the second node via a local Ethernet network.

13. The communication system of claim 11, wherein the Ethernet user interface port in the first node is coupled to the Ethernet user interface port in the second node via an Ethernet network and an Internet Protocol Network.

14. The communication system of claim 11, wherein the non-Ethernet user interface port in the first node is configured according to one of an Nx64k protocol and a G.703 protocol; and
wherein the non-Ethernet user interface port in the second node is configured according to one of an Nx64k protocol and a G.703 protocol.

15. The communication system of claim 14, wherein the non-Ethernet user interface port in the each of the first and second nodes is configured according to a framed G.703 protocol having predefined timeslots in a G.703 frame.

16. The communication system of claim 15, wherein the first node is configured to extract data in the timeslots from each received G.703 frame, to insert a first portion of the extracted timeslot data from each G.703 frame into a corresponding Ethernet signal having a respective emulated circuit identification and to insert a second portion of the extracted timeslot data from each G.703 frame into a corresponding DSL frame.

17. The communication system of claim 15, wherein the non-Ethernet user interface port in each of the first node and the second node is configured to transmit and receive fractional G.703 frames in which only a portion of the timeslots in each respective fractional G.703 frame contains data.

18. A method of communicating data in a communication system, the method comprising:
receiving an Ethernet signal over an Ethernet user port in a digital subscriber line (DSL) communication unit;
determining if the Ethernet signal is associated with an emulated circuit;
if the Ethernet signal is associated with an emulated circuit:
extracting data from a payload of the Ethernet signal; and
outputting the extracted data over a non-Ethernet user port associated with the emulated circuit, the non-Ethernet user port configured to transmit and receive signals according to a protocol different from an Ethernet protocol; and
if the Ethernet signal is not associated with an emulated circuit:
outputting the Ethernet signal in a DSL frame over at least one DSL port; or
discarding the Ethernet signal.

19. The method of claim 18, further comprising:
receiving a non-Ethernet signal over the non-Ethernet user port;
extracting data from the non-Ethernet signal;
encapsulating the extracted data in an Ethernet frame having a respective emulated circuit identification; and
outputting the Ethernet frame over the Ethernet user port.

20. The method of claim 19, wherein encapsulating the extracted data in the Ethernet frame further comprises encapsulating the Ethernet frame in an internet protocol packet having an internet protocol header.

21. The method of claim 18, wherein the non-Ethernet user port associated with the emulated circuit is configured to transmit and receive signals according to a structured G.703 protocol, the method further comprising:
   receiving a structured G.703 signal over the non-Ethernet user port;
   extracting a first set of timeslots from the structured G.703 signal;
   extracting a second set of timeslots from the structured G.703 signal;
   encapsulating the first set of timeslots in an Ethernet frame having a respective emulated circuit identification;
   inserting the second set of timeslots into a DSL frame;
   outputting the Ethernet frame over the Ethernet user port; and
   outputting the DSL frame over at least one DSL port.

22. The method of claim 18, wherein extracting data from a payload of the Ethernet signal comprises extracting a first portion of data from the payload and extracting a second portion of data from the payload; and
   wherein outputting the extracted data over a non-Ethernet user port associated with the emulated circuit comprises outputting the first portion of extracted data over a first non-Ethernet user port and outputting the second portion of extracted data over a second non-Ethernet user port, each of the first and second non-Ethernet user ports configured to transmit and receive signals according to a respective protocol different from an Ethernet protocol.

* * * * *